W. B. BALDWIN.
BEET TOPPER.
APPLICATION FILED MAY 13, 1907.

911,197.

Patented Feb. 2, 1909.

4 SHEETS—SHEET 1.

Witnesses

Inventor
William B. Baldwin
By

Attorneys.

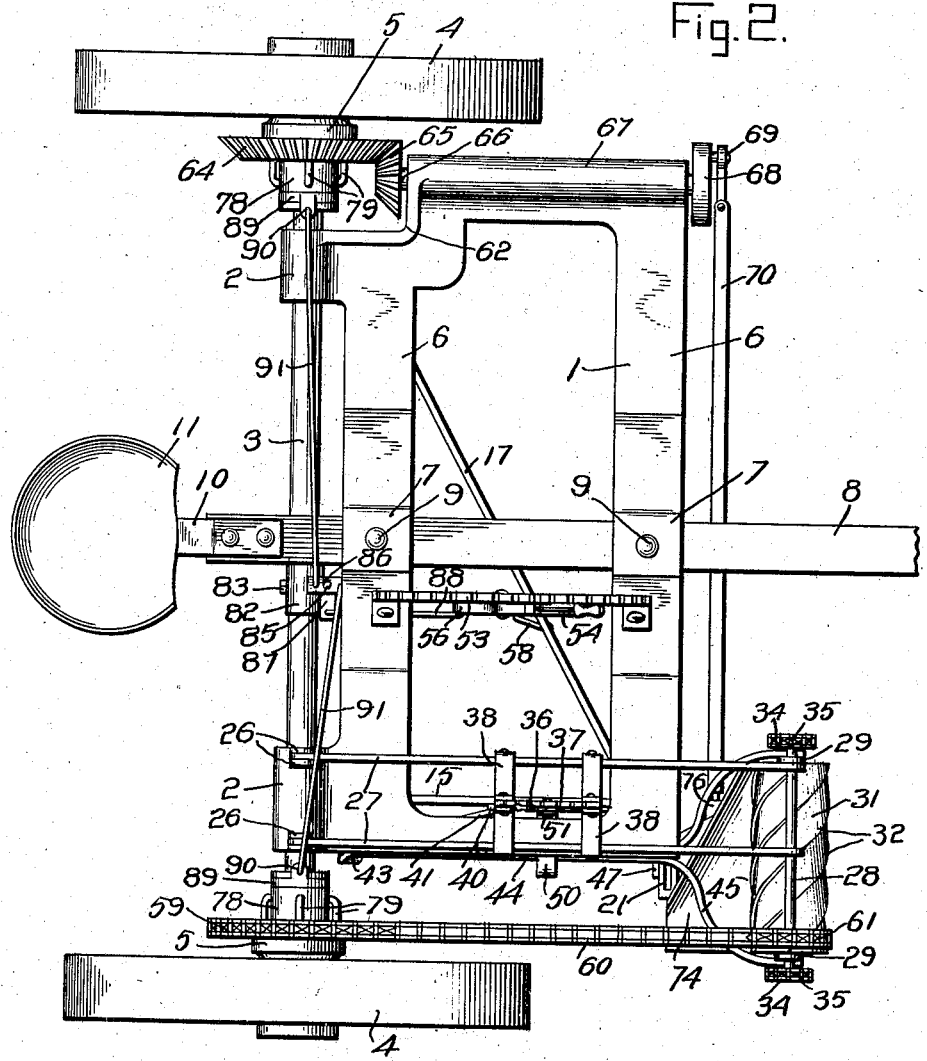

W. B. BALDWIN.
BEET TOPPER.
APPLICATION FILED MAY 13, 1907.
911,197.
Patented Feb. 2, 1909.
4 SHEETS—SHEET 3.
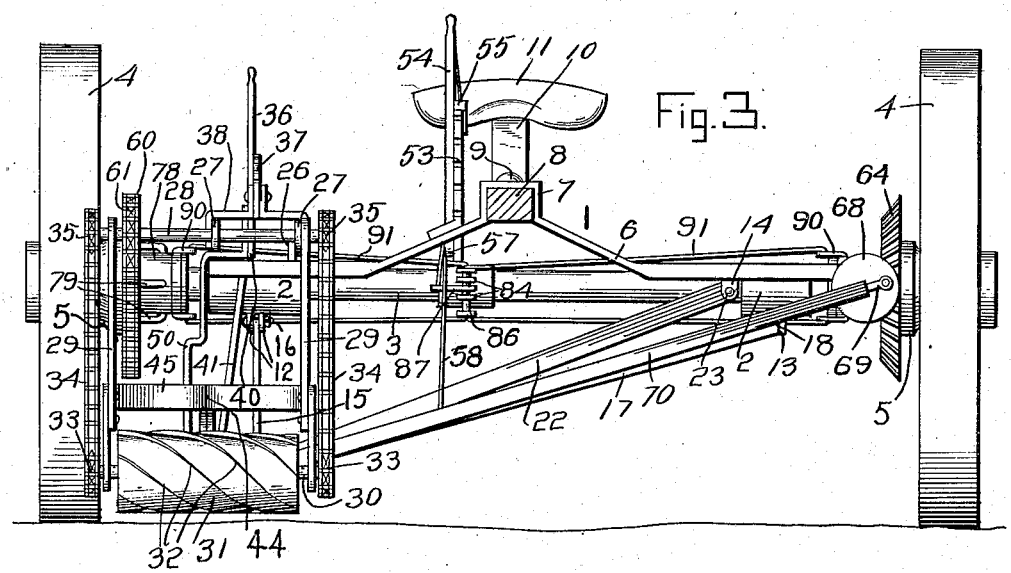
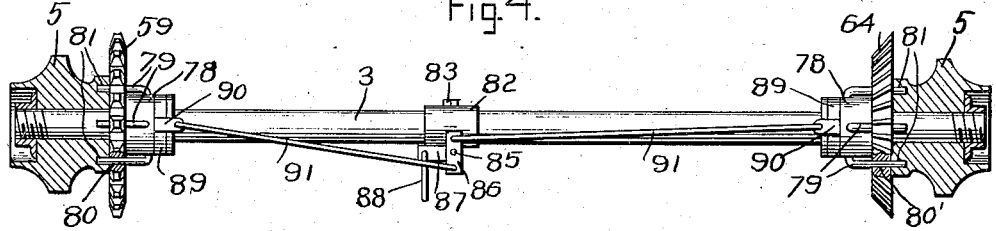

W. B. BALDWIN.
BEET TOPPER.
APPLICATION FILED MAY 13, 1907.
911,197.
Patented Feb. 2, 1909.
4 SHEETS—SHEET 4.
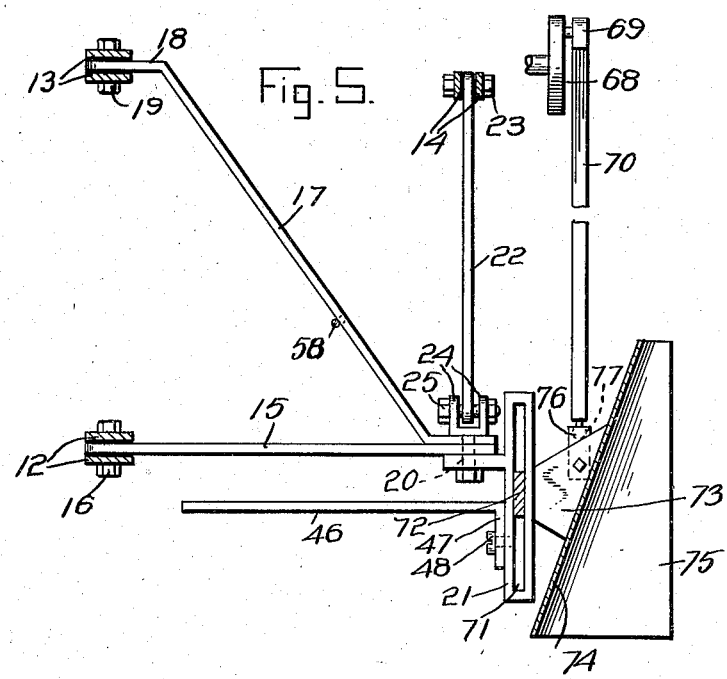
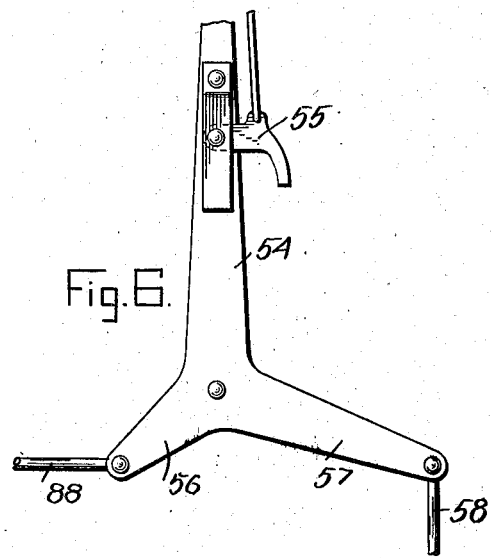
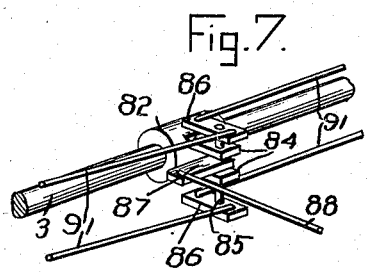
Witnesses
Inventor
William B. Baldwin
By 
Attorneys

UNITED STATES PATENT OFFICE.

WILLIAM B. BALDWIN, OF FOWLER, COLORADO.

BEET-TOPPER.

No. 911,197.  Specification of Letters Patent.  Patented Feb. 2, 1909.

Application filed May 13, 1907. Serial No. 373,389.

*To all whom it may concern:*

Be it known that I, WILLIAM B. BALDWIN, a citizen of the United States, residing at Fowler, in the county of Otero, State of Colorado, have invented certain new and useful Improvements in Beet-Toppers; and I do hereby declare the following to be a full, clear, and exact description of the invention, such as will enable others skilled in the art to which it appertains to make and use the same.

This invention relates to new and useful improvements in machines for topping beets, and it has particular reference to a machine including a wheeled supporting frame and an auxiliary frame suspended therefrom, the latter carrying a ground roller and a cutting knife movable with relation to said ground roller and which is employed to carry out the functions of the machine.

The invention aims as a primary object to provide a novel means for raising the auxiliary frame so that the operative elements thereof are out of position for action on the beets.

Figure 1:
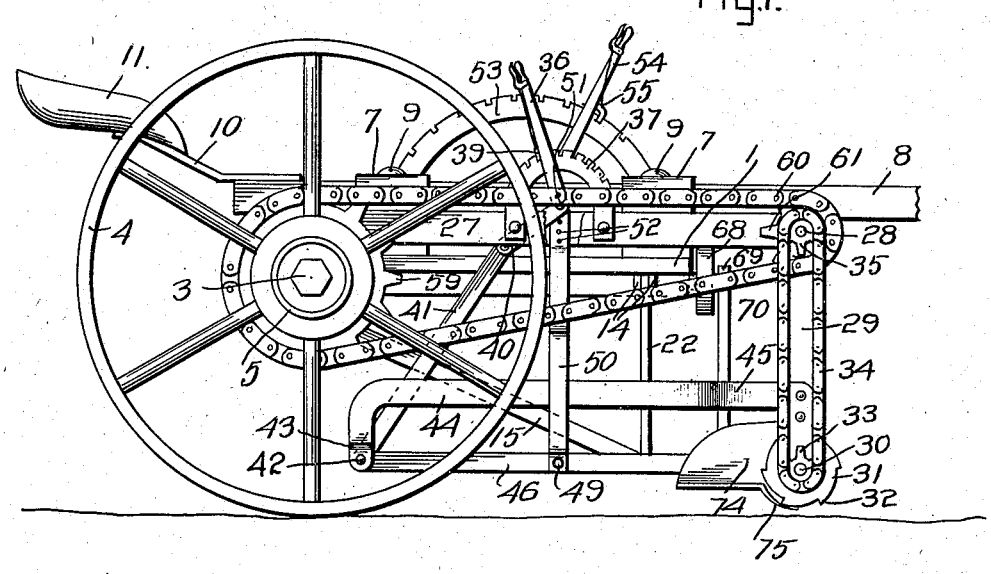
Figure 1:
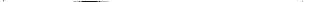

The invention aims as a further object to provide a machine of this type embodying a novel construction, combination and arrangement of parts, the details of which will appear in the course of the following description, in which reference is had to the accompanying drawings forming a part of this specification, like characters of reference designating similar parts throughout the several views, wherein:

Figure 1 is a side elevation looking at one side of a machine constructed in accordance with the present invention. Fig. 2 is a top plan view thereof. Fig. 3 is a front elevation thereof. Fig. 4 is a horizontal cross section through the hubs of the wheel, showing the mechanism for throwing the transmission elements into and out of gear with said hubs. Fig. 5 is a fragmentary plan view showing interconnected elements of the auxiliary frame, and by means of which the auxiliary frame as an entirety is raised and lowered. Fig. 6 is a fragmentary side elevation of the lever for raising and lowering said auxiliary frame and showing the connecting elements to the mechanisms illustrated in Figs. 4 and 5, and, Fig. 7 is a detailed perspective view of a centrally located casting and the associated parts thereof which are embodied as elements of the mechanism illustrated in Fig. 2.

Referring specifically to the accompanying drawings, the numeral 1 designates the main frame which is constituted of an integral casting and is formed rearwardly thereof with sleeves 2 which serve as bearings for the main power shaft 3, the latter carrying on its projecting ends the traction wheels 4 formed with the hubs 5. The frame 1 is of skeleton formation for the sake of lightness and has its parallel longitudinal front and rear bars 6 constructed centrally thereof with raised seats 7 of inverted U-shape to receive the forwardly projecting tongue 8, the latter being held against displacement by bolts 9. From the rear end of the tongue 8 is supported a resilient post 10 upon the upper end of which is mounted the driver's seat 11. The auxiliary frame is, as previously noted, suspended from the frame 1 and with this object in view the sleeves 2 are formed with depending spaced apertured lugs 12 and 13 and the front bar 6 is formed with similar lugs 14 extending at right angles to the lugs 12 and 13. A bar 15 has its upper end pivoted between the lugs 12 by means of a bolt 16, and a bar 17 has its upper end extended at an angle as at 18, and pivoted between the lugs 13 by means of a bolt 19. The bar 17 converges downwardly towards the bar 15 and is connected therewith by a bolt 20, the latter also serving as the pivot for a casting 21 to be more fully described hereinafter. A bar 22 has its upper end pivoted between the lugs 14 by a bolt 23. The bolt 20 has its head formed with spaced lugs 24 between which the lower end of the bar 22 is received, a bolt 25 constituting a pivot therefor. The sleeve 2 which carries the lugs 12 is also provided with upwardly extending lugs 26 between which are pivotally received the ends of bars 27, the latter projecting forwardly and conjointly supporting at their front ends a transverse shaft 28, the bars 27 normally resting upon the bars of the frame 1. The shaft 28 constitutes a support for vertical bars 29 which depend pivotally therefrom and which support, as will be later stated, a transverse shaft 30, the latter carrying between said bars a ground roller 31 formed with spiral serrations 32, and on their projecting ends sprocket wheels 33 which are driven by chains 34 from similar sprocket wheels 35 mounted upon the projecting ends of the shaft 28.

As noted the bars 29 depend pivotally from the shaft 28 and in such relation are displaceably movable to vary the disposition of the roller 31 with relation to the cutting knife to be later described. The mechanism for moving the bars 29 on the shaft 28 as a pivot is constituted essentially of a lever 36 pivotally mounted upon the frame of a rack segment 37, the latter being supported upon transverse bars 38 which span and are secured to the bars 27. The lever 36 is constructed with a pawl 39 to coöperate with said segment. The lever 36 is formed at its lower end with an angularly projecting portion 40 to which is pivoted the upper end of a link 41, the lower end of said link being pivoted by a pin 42 to the depending bifurcated rear end 43 of a forwardly projecting bar 44 having its front end shaped to afford a yoke 45, the lugs of which are secured to the bars 29 and are formed to surround the shaft 30 between said bars and the sprocket wheels 33. A forwardly projecting bar 46 has its rear end pivotally engaged by the pin 42 above referred to and its front end bent angularly as at 47, and pivoted by a pin 48 to the casting 21. The bar 46 is pivotally connected as at 49, to the lower end of a vertical bar 50 which is of angular formation and which has its upper end engaged with the pivot pin 51 of the lever 36, the bar 50 having its upper end formed with a vertical line of apertures 52 whereby such engagement may be adjustable.

Between the bars 6 of the frame 1 is a rack segment frame 53 upon which is pivotally mounted a lever 54 the latter being illustrated more particularly in Fig. 6. The lever 54 carries a pawl 55 which coöperates with the segment 53 and has its lower end at a distance below its pivot formed with rearwardly and forwardly projecting angular arms 56 and 57 respectively. The auxiliary frame above described is suspended by a chain, wire or other device 58 from the end of the arm 57, the lower end of the chain 58 being engaged with the bar 17.

Loosely mounted upon the shaft 3 is a sprocket wheel 59 which serves by means of a chain 60 to drive a sprocket wheel 61, the latter being fast upon the shaft 28 between the bars 29. It will thus be seen that the shaft 3 drives the shaft 28 and that the latter drives the roller 31.

The frame 1 is constructed at one end thereof with an angular recess 62, within which is a bevel pinion 64, the latter being loose upon the shaft 3, and which meshes with a smaller bevel pinion 65 on the inner end of a shaft 66, the latter being journaled in a sleeve 67 formed integral with the frame 1 at one side thereof. The shaft 66 carries at its outer projecting end a disk 68 which has eccentric connection by means of a gimbal joint 69 with a pitman 70.

Referring more particularly to the construction of the casting 21 above mentioned, it will be noted that said casting is formed with a slot 71 through which is engaged the angular portion 72 of a bracket 73, the latter having connection with the deflecting board 74 of a reciprocating cutting knife 75 which is disposed rearwardly of the roller 31 and which partially underlies the same. The bracket 73 carries a socket member 76 within which is received the ball-shaped end 77 of the pitman 70 and by means of which the knife 75 is reciprocated laterally, the casting 21 constituting a guide for the same in such movement.

As previously noted the sprocket wheel 59 and the bevel gear 64, from which the ground roller and cutting knife are respectively operated, are mounted loosely upon the shaft 3, but are formed to be operated from the hubs 5 in coaction with the mechanism illustrated in Fig. 4. Slidably mounted on the shaft 3 are similarly constructed sleeves 78 formed with outwardly projecting clutch pins 79 which are designed to be engaged through openings 80 and 80' in the respective sprocket wheel 59 and gear 64, and into similarly arranged recesses 81 in the hubs 5. Centrally located upon the shaft 3 is a casting 82, which is held in fixed relation by a set screw 83 threaded therethrough and bearing against said shaft. The casting 82 is constructed with forwardly projecting lugs 84 to afford bearings for a short length vertical shaft 85, the latter carrying at its projecting upper and lower ends two-armed levers 86 and between the lugs 84 an arm 87 disposed at an angle to the levers 86 and connected by a rod or wire 88 to the arm 56 of the lever 54. Rotatably mounted upon the sleeves 78 are collars 89 formed with oppositely disposed projecting lugs 90 which are connected on each side of the casting 82 with relatively opposite ends of the levers 86 by means of links 91.

In use it will be apparent that rearward movement of the lever 54 raises the auxiliary bars herein described, and through the medium of the rod or wire 88 rocks the shaft 85, the latter by virtue of the connections described, moving the sleeves 78 so as to disengage the pins 79 from the sprocket wheel 59, the gear 64, and the respectively adjacent hubs 5. The machine can now be advanced without an action of the parts, since the roller 31 and the knife 75 are raised above the ground and the driving elements therefor are out of gear with the hubs 5. Forward movement of the lever 54 effects a reverse operation as will be readily understood. The roller 31 is geared to move at a greater speed than the wheels 4 and in such movement its serrations 32 force the tops of the beets rearwardly to the deflecting board 74, from whence they are shed between the rows for final disposition. Rearward movement of the lever 36 serves, through the medium of the connected bars 41, 44 and 46, to bring the roller 31 and the knife 75 into intimate relation, and forward movement of said lever in reverse manner moves these elements away from one another, such adjustment being made necessary by the varying conditions of growth. It is to be especially noted that the lugs 12 and 13 are spaced away a considerable distance and that the bars 15 and 17 loosely surround the bolts 16 and 19, whereby considerable play may be had when the auxiliary frame is raised in the manner before described, such play being necessary by virtue of the angular disposition of the pivot 23 of the bar 22 with relation to the pivots 16 and 19. A beet topper constructed in accordance with the present invention is simple in construction, comparatively inexpensive to manufacture, and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. A machine of the type set forth comprising a wheeled supporting frame, a forwardly extending bar pivoted to the rear end of said first named bar, a beet topping said rear end and extending in convergent relation to said first named bar, a bar pivoted to said frame at one side thereof, a common pivotal connection for the adjacent ends of said bars, a casting secured to the forward end of said first named bar, a beet topping knife carried by said casting and means for supporting said bars in their pivotal assemblage.

2. A machine of the type set forth comprising a wheeled supporting frame, a forwardly extending bar pivoted to the rear end of said frame, a second bar pivoted to said rear end and extending in convergent relation to said first named bar, a bar pivoted to said frame at one side thereof, a common pivotal connection for the adjacent ends of said bars, a casting secured to the forward end of said first named bar, a beet topping knife carried by said casting and supporting means for said bars in their pivotal assemblage including means for raising or lowering the same on their pivots to selected positions.

In testimony whereof, I affix my signature, in presence of two witnesses.

WILLIAM B. BALDWIN.

Witnesses:
H. T. GIBSON,
M. J. STONE.